Patented Feb. 15, 1949

2,461,894

UNITED STATES PATENT OFFICE 2,461,894

CONDENSATION PRODUCTS OF TRI-(BETA-AMINOETHYL)-AMINE AND BETA-DIKETONES OR HYDROXY METHYLENE KETONES

Lyle A. Hamilton, Pitman, and Charles J. Pedersen, Penns Grove, N. J., assignors to E. I. du Pont de Nemours & Company, Wilmington, Del., a corporation of Delaware No Drawing. Application June 4, 1947, Serial No. 752,562

5 Claims. (Cl. 260—566)

This invention relates to new chemical compounds and more particularly to condensation products of tri-(beta-aminoethyl)-amine with beta-diketones and beta hydroxy ketones.

It is known that many organic products tend to oxidize and deteriorate in the presence of oxygen. Frequently, such organic products become contaminated with, or come into contact with, metals and metal compounds which are active to catalyze the oxidation and deterioration of such organic products.

It has been proposed to condense various amines with certain ketones and aldehydes to produce compounds of the Schiff's base type which are effective to varying degrees in inhibiting the oxidation and deterioration of organic products. Some of such compounds are effective to inhibit oxidation and deterioration of the organic products in the presence of oxygen and in the absence of catalytically active metals and their compounds but are substantially ineffective in the presence of such catalytically active metals. Other compounds of the Schiff's base type, particularly those derived from certain diamines and orthohydroxy aromatic aldehydes, as disclosed in Patent 2,181,121 to Downing et al., are effective to overcome the catalytic effect of copper and its compounds and are known as copper deactivators or metal deactivators. Generally, such metal deactivators are effective to deactivate only one or two metals and, hence, are of rather limited usefulness because organic products frequently come into contact with a number of different catalytically active metals.

It is an object of the present invention to provide new chemical compounds. Another object is to provide new chemical compounds of the Schiff's base type which are the condensation products of a tri-(beta-aminoethyl)-amine with a beta diketone or a hydroxy methylene ketone. A further object is to provide chemical compounds of the Schiff's base type which are particularly effective for suppressing the catalytic activity of most of the metals with which oxidizable organic products are ordinarily brought into contact. Other objects are to advance the art. Still other objects will appear hereinafter.

The above and other objects of our invention may be accomplished by providing compounds of the formula

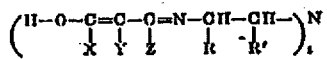

wherein each of R and R' represents a member of the group consisting of hydrogen and methyl radicals, each of X and Y represents a member of the group consisting of hydrogen and alkyl, aralkyl and aryl radicals and Z represents a member of the group consisting of alkyl, aralkyl and aryl groups. We have found that such compounds may be readily prepared by the condensation of one mol of a tri-(beta-aminoethyl)-amine with three mols of a beta diketone whereby one of the carbonyl groups condenses with the primary amino group and the other carbonyl group is converted to a hydroxy methylene group. The compounds may also be obtained by condensing the amine with a beta-(hydroxy methylene) ketone in place of the beta diketone. In general, such compounds are effective to suppress the catalytic action of vanadium, chromium, iron, cobalt, nickel and copper and their catalytically active compounds on the oxidation of oxidizable organic products. These compounds are unusual in this respect since most metal deactivators are effective to suppress the catalytic activity of only one or two of such metals.

The amines, from which our compounds are prepared, are the tri-(beta-aminoethyl)-amines of the general formula

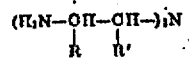

wherein each of R and R' represents a member of the group of hydrogen and methyl radicals. Preferably, however, the compounds are prepared from tri-(beta-aminoethyl)-amine itself wherein each of R and R' in the formula represents hydrogen solely.

The beta diketones, employed for producing our compounds, may be represented by the formula

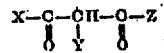

wherein each of X and Y represents hydrogen or an alkyl, aralkyl, or aryl radical and Z represents an alkyl, aralkyl, or aryl radical. Preferably, Y represents hydrogen and X and Z represent hydrocarbon radicals and particularly alkyl radicals. The resulting preferred compounds are particularly effective for overcoming the catalytical activity of vanadium, chromium, iron, cobalt, nickel, copper, manganese and their compounds. Of these, tri-(acetylacetone) tri-(beta-aminoethyl)-amine is the most effective and it is preferred. Other desirable compounds are tri-(propionylacetone) tri-(beta-aminoethyl)-amine derived from propionylacetone and tri-(benzoylacetone) tri-(beta-aminoethyl)-amine derived from benzoylacetone.

In place of the beta diketones, we may employ the corresponding beta-(hydroxy methylene) ketones which may be represented by the formula

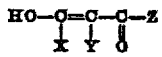

Particularly desirable beta-(hydroxy methylene) ketones are hydroxy methylene acetone and hydroxy methylene camphor which form tri-(hydroxy methylene acetone) tri-(beta-aminoethyl)-amine and tri-(hydroxy methylene camphor) tri-(beta-aminoethyl)-amine, respectively.

The ketones, which may be employed to produce our novel compounds, may contain halogens, nitro groups, or groups such as

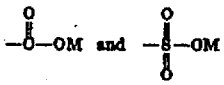

wherein M is a salt-forming group or element such as ammonium, lithium, sodium, potassium, and magnesium.

The compounds of our invention include salts wherein the hydrogen atoms of the hydroxy groups are replaced by metals or other suitable cations such as lithium, sodium, potassium, magnesium, calcium, strontium, barium, zinc, cadmium, tin, ammonium and tetra-alkyl ammonium. Some of such salts, such as those of the alkali metals, are water-soluble and are particularly suitable for use in aqueous systems.

The compounds of this invention are light buff colored products and are generally crystalline and colorless when pure. Many are soluble in water and all form water-soluble salts and are soluble in alcohols. They are sufficiently soluble in hydrocarbons, such as gasoline, lubricating oils and the like and in rubber so that they may be dissolved therein in an amount sufficient to protect such products against the catalytic action of metals. These compounds may be readily prepared by mixing the amine and the beta-diketone or beta-(hydroxy methylene) ketone at room temperatures. Their preparation is usually facilitated by carrying out the reaction in a solvent, such as water, dilute aqueous alkali, methanol, alcohol and the like. The reaction is exothermic and hence it will generally be desirable to add one of the reactants gradually to the other, employing cooling if desired.

As illustrative of such a preparation, tri-(acetylacetone) tri-(beta-aminoethyl)-amine was prepared by dissolving 14.05 grams of tri-(beta-aminoethyl)-amine trihydrochloride in 20 cc. of water and then adding 6 grams of sodium hydroxide as a 30% aqueous solution and 10 cc. of methanol. To this solution were added 14.6 grams of acetylacetone and the mixture was stirred. The reaction was spontaneous and the resulting product, after ether extraction, analyzed 14.05% nitrogen (calculated nitrogen=14.28%).

Compounds of our invention are particularly useful for addition to oxidizable organic products which are brought into contact with or which may be contaminated with catalytically active metals.

The amount of the compounds added to the organic materials will be dependent upon the amount of metal catalyst present in the organic materials. Generally, the compounds will be added in an amount equal to about 5 to about 30 times the amount of catalytic metal present.

In order to illustrate the desirable properties of our new compounds, the following example is given:

EXAMPLE I

To a cracked gasoline which had been completely refined but which was otherwise untreated with chemical agents, such as dyes, anti-knock and antioxidants, and which had an induction period of 120 minutes, was added 0.0025% of 4-(n-butylamino)-phenol, an antioxidant, whereby the induction period was raised to 375 minutes. To different samples of this gasoline, there was added gasoline soluble salts of the catalytic element (indicated by the chemical symbols of the element) in the indicated concentrations in parts per million of the element. To portions of these samples, there was added 0.005% by weight of tri-(acetylacetone) tri-(beta-aminoethyl)-amine. The induction periods of the various samples were then determined by the Voorhees-Eisinger induction method described in J. I. E. C. 25, 397 (1933). The results are given in the following Table I:

Table I

| Deactivator | Voorhees-Eisinger Induction Period in Minutes | | | | | | |
|---|---|---|---|---|---|---|---|
| | No catalyst | V 0.8 | Cr 0.51 | Fe 0.57 | Co 0.92 | Ni 0.92 | Cu 1.0 |
| None | 375 | 60 | 355 | 305 | 175 | 305 | 45 |
| Tri-(acetylacetone) tri-(beta-aminoethyl)-amine | 405 | 250 | 420 | 395 | 325 | 415 | 230 |

When disalicylal propylenediamine was tested in the same manner as that described above, it was found that while it was effective to deactivate copper, it was ineffective to deactivate chromium or nickel and actually increased the pro-oxidant effects of manganese, iron and cobalt. This is illustrative of the effects obtained with Schiff's base type compounds heretofore proposed as metal deactivators as in Patents 2,181,121, 2,181,-122, 2,255,597, 2,284,267, 2,285,259 and 2,285,260.

It will thus be apparent that by our invention we have provided a class of new chemical compounds which can be readily prepared. These compounds have novel properties which render them useful and valuable in applications where related compounds of the prior art are not applicable.

This is a continuation-in-part of our copending application Serial No. 627,260 filed November 7, 1945, now abandoned.

We claim:

1. A compound of the formula

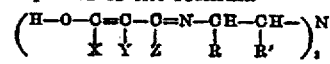

wherein each of R and R' represents a member of the group consisting of hydrogen and methyl radicals, each of X and Y represents a member of the group consisting of hydrogen and hydrocarbon radicals and Z represents a hydrocarbon group.

2. A compound of the formula

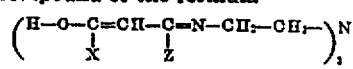

wherein X represents a hydrocarbon radical and Z represents an alkyl radical.
3. Tri-(acetylacetone) tri-(beta-aminoethyl)-amine.
4. A compound of the formula
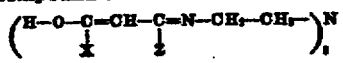
wherein X represents an alkyl radical and Z represents an alkyl radical.
5. A compound of the formula
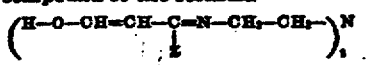
wherein Z represents an alkyl radical.
LYLE A. HAMILTON.
CHARLES J. PEDERSEN
No references cited.

Certificate of Correction

February 15, 1949.

Patent No. 2,461,894.

LYLE A. HAMILTON ET AL.

It is hereby certified that error appears in the printed specification of the above numbered patent requiring correction as follows:

Column 2, lines 27 to 33 inclusive, for the indistinct printed matter insert *one or two of such metals.*

*The amines, from which our compounds are prepared, are the tri-(beta-aminoethyl)-amines of the general formula*

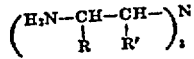

and that the said Letters Patent should be read with this correction therein that the same may conform to the record of the case in the Patent Office.

Signed and sealed this 19th day of April, A. D. 1949.

[SEAL]

THOMAS F. MURPHY,
*Assistant Commissioner of Patents.*